United States Patent
Rauch et al.

(10) Patent No.: US 6,801,153 B2
(45) Date of Patent: Oct. 5, 2004

(54) SPREAD SPECTRUM RADAR WITH LEAK COMPENSATION AT BASEBAND

(75) Inventors: Sol Rauch, Nepean (CA); Michael K. C. Kwong, Nepean (CA)

(73) Assignee: Spectrum Target Detection, Inc., Gatineau (CA)

( * ) Notice: Subject to any disclaimer, the term of this patent is extended or adjusted under 35 U.S.C. 154(b) by 0 days.

(21) Appl. No.: 10/278,960

(22) Filed: Oct. 23, 2002

(65) Prior Publication Data

US 2003/0090405 A1 May 15, 2003

(30) Foreign Application Priority Data

Nov. 2, 2001 (CA) ............................................ 2,361,015

(51) Int. Cl.⁷ ................................................. G01S 7/28
(52) U.S. Cl. ........................... 342/21; 342/70; 342/108; 342/115; 342/145
(58) Field of Search ........................... 342/21, 70, 104, 342/107, 108, 115, 145

(56) References Cited

U.S. PATENT DOCUMENTS

| | | | | |
|---|---|---|---|---|
| 5,497,160 A | * | 3/1996 | Koehler et al. | 342/145 |
| 5,731,781 A | * | 3/1998 | Reed | 342/135 |
| 5,731,782 A | * | 3/1998 | Walls | 342/145 |
| 5,999,048 A | * | 12/1999 | Zhou | 330/151 |
| 6,549,567 B1 | * | 4/2003 | Fullerton | 375/219 |
| 2002/0186362 A1 | * | 12/2002 | Shirai et al. | 356/5.05 |
| 2003/0090405 A1 | * | 5/2003 | Rauch et al. | 342/21 |

OTHER PUBLICATIONS

"A pre–crash radar sensor system based on pseudo–noise coding", Filimon, V.; Buechler, J.; Microwave Symposium Digest., 2000 IEEE MTT–S International, vol.: 3, Jun. 11–16, 2000 pp.: 1415–1418 vol. 3.*

* cited by examiner

*Primary Examiner*—John B. Sotomayor
(74) *Attorney, Agent, or Firm*—Thomas R. Vigil; Welsh & Katz, Ltd.

(57) ABSTRACT

A spread spectrum radar system, characterized in that the receive radar signal is mixed down to baseband and applied to leak cancellation means for subtracting therefrom an attenuated delayed version of the transmit radar signal to provide a reflected receive radar signal with improved signal-to-noise ratio for further processing and to prevent receiver saturation. The radar allows the capture of the range and speed of identified targets, and facilitates a determination of the target's direction. It exhibits an inherent immunity to electromagnetic interference, and is relatively undetectable by radar detectors. The system is easily reprogrammable for different range resolutions and permits Doppler processing to be independent of the angle between radar signal and the track of the target.

16 Claims, 5 Drawing Sheets

SPREAD SPECTRUM RADAR WITH LEAK COMPENSATION AT BASEBAND

BACKGROUND OF THE INVENTION

1. Field of the Invention

The present invention is directed to radar systems in general, and in particular to such systems utilizing spread spectrum (SS) and pseudo-noise (PN), maximal length sequence technologies. More particularly still, it is directed to a radar system where compensation (partial cancellation) of the leaked transmit signal is accomplished at baseband of the PN code sequence. As such, the radar system is particularly useful in police radar gun, traffic monitoring and automotive collision avoidance applications, where the use of a single antenna for both transmit and receive is desirable.

2. Prior Art of the Invention

U.S. Pat. No. 5,657,021 (commonly owned by the present assignee) for a SYSTEM AND METHOD FOR RADAR VISION FOR VEHICLES IN TRAFFIC, issued Aug. 12, 1997 discloses interference-free radar systems utilizing PN waveforms for sequential transmission by radar, wherein the PN waveform is tapped and adjustably attenuated to cancel leakage within the system prior to correlation of the received echo.

A paper titled A COLLISION AVOIDANCE RADAR USING SIX-PORT PHASE/FREQUENCY DISCRIMINATOR (SPFD) by Ji LI et al published May 23, 1994 in 1994 IEEE MTT-S Digest, pp. 1553–1556, proposed a novel technique for collision avoidance radar used in automobiles, in which a new six-port microwave/millimeter wave digital phase/frequency discriminator (SPFD) is used to measure Doppler frequency shifts. Both relative speed and moving direction of the target are readily obtained. Ranging is implemented by the measurement of phase difference at two adjacent frequencies.

In this paper by LI et al state:

"In CW type radars, one of the most serious problems is to achieve sufficient isolation between transmission and reception. To prevent the receiver from saturation, separate transmitting and receiving antennas are often used. This results in unwanted larger volume and higher cost. Some other solutions such as Reflected Power Canceller (RPC) [6] are proposed and implemented, however the cost and complexity are still high. In contrast, by using new SPFD it is very easy to integrate a RPC into the sensor at the expense of only a vector modulator (phase shifter and attenuator). The single antenna scheme is shown in FIG. 3. In the six-port PFD, the leakage of the transmitted signal yields a deviation of the detected vector from the origin. A feedback algorithm can be adopted to control the loop to realign the vector to the origin, such that the leakage power is canceled out".

In UK patent application GB 2,268,350, published May 1, 1994, for HIGH RANGE RESOLUTION RADAR a phase-coded signal is transmitted by one antenna and the reflections received by another. Both the outward and return signals are mixed in a quadrature mixer to produce a baseband replica of the coded signals, which are then filtered and, amplified before being applied to a correlator. Internal signal leakage in this system does not appear to be a problem.

In U.S. Pat. No. 5,134,411, issued Jul. 28, 1992, a NEAR RANGE OBSTACLE DETECTION AND RANGING AID apparatus is disclosed. Range measurement signals are produced by means of phase comparison of signals in two paths. The subject of "Leakage Correction" is discussed as follows:

"In a practical system one or more leakage paths may exists between the RF and LO ports of the mixer. When measuring a target with a weak echo signal, a stronger leakage signal may cause significant errors. Since the transformation 13 has a commutative property, we can generate a corrected signal $u_{corr}(i)=u(i)-u_{cal}(i)$, which is to be used in equation 13. The signal $u_{ca}(i)$ is measured when no targets are present. Alternatively, we can measure $u_{ca}(i)$ even in the presence of targets, if both antennas are replaced by a matched load. In this case, however, the external leakage between the antennas cannot be corrected and therefore will limit the useful dynamic range of the target echo".

The issue of leakage in the circulator in FIG. 7, where a single antenna is used, is not addressed.

In a paper by Yukiko HANADA et al titled VEHICULAR SPREAD SPECTRUM RADAR FOR MULTIPLE TARGETS DETECTION USING MULTI-BEAM ANTENNA (IEIC TRANS. FUNDAMENTALS, VOL. E-80, NO. 12 DECEMBER 1997), the author propose and investigate a vehicular radar system that can measure the distance to, the relative speed of and the direction of arrival (DOA) of the reflected waves from multiple targets or vehicles using the direct-sequence spread spectrum (DS-SS) technique. In particular, they propose a DOA estimation scheme using a multi-beam antenna. In order to show that the proposed system can accurately measure the above-mentioned quantities, the performance is evaluated numerically in a multi-path environment. Moreover, the optimal multi-beam pattern is derived to minimize error probability of DOA estimation. The author state that they use several antennas which form sharp multiple beams, which can be implemented by using several types of antennas such as phased array antenna and a combination of directional antennas.

In a paper titled 76 GHZ AUTOMOTIVE MILLIMETER-WAVE RADAR USING SPREAD SPECTRUM TECHNIQUE by Hiroshi ENDO et al, published in SAE TECHNICAL PAPER SERIES 1999-0102923, the author state:

"In SS radar, transmission signals are modulated using PN codes, and then transmitted through the transmission antenna. The signal reflected from a target located ahead of the radar equipped vehicle has a time delay that corresponds with the two-way range delay, the Doppler shift corresponds with the range rate between the radar equipped vehicle and a target ahead; and that signal that is received by the reception antenna. The PN sequences have an auto-correlation function as shown in FIG. 1. Utilizing these characteristics, SS radar can measure range from the phase difference of PN sequences. The range rate can be measured by frequency analysis when the correlation peak is detected. In this method, accurate raging and multiple target separation are possible due to the detection method using the auto-correlation characteristics of PN sequences. Moreover, SS modulation has excellent interference capabilities since the demodulation process using PN sequence spreads undesired signals or interference in the channel and thus suppresses those signals".

Finally, in a paper titled SYSTEM ASPETS AND DESIGN OF AN AUTOMOTIVE COLLISION WARNING PN CODE RADAR USING WAVEFRONT RECONSTRUCTION By Jürgen DETLEFSON et al, published in 1992 IEEE MTT-S Digest, pp.625–628, the author disclose a 61 GHZ radar system with the following parameters:

| | |
|---|---|
| Carrier frequency | 61 GHz |
| subcarrier frequency | 1.2 GHz |
| range resolution | 0.75 m |
| unambiguous range | 767 m |
| maximum range | 150 m |
| Modulation | BPSK |
| Code | maximal length PN sequence |
| code length | 1023 chips |
| Chiprate | 200 Mchips/s |
| code repetition frequency | 196 kHz |
| angular resolution | wavefront reconstruction by FFT |
| angular resolution cells | 4/8 |
| angular resolution cell width | 3°/1.5° |
| field of view | 12° × 150 m |
| rf-power | 1.6 mW |
| maximum Doppler frequency | +/−20 KHz |

SUMMARY OF THE INVENTON

The radar systems of the present invention have some of the features of prior art systems. In a preferred implementation of the present invention, the radar is based on a CW carrier phase modulated with a maximal length PN code sequence providing a low power spread spectrum signal. Target range is determined by correlating the radar return signal with a delayed copy of the transmitted PN code.

An important feature of the present invention is signal leakage compensation by means of signal feedthrough cancellation techniques. Such compensation, while generally useful, is particularly desirable for compact radar systems, whether for law enforcement applications (police radar gun) or for automotive and similar applications. However, while the system of the present invention is particularly suitable for single antenna radars, it is still applicable where separate transmit and receive antennas are used. In such applications, it would permit improved performance, for example, range increase and/or decreased receiver dynamic range requirements.

A brief general description of the theory of operation of the spread spectrum system provides a better understanding of the basis for the unique features of the system. The following features are directly derived from the exploitation of PN maximal sequences as the class of modulation waveforms that are used in the present radar. These features are:

Direct, simple and accurate range measurements to a target;

Immunity to electromagnetic interference;

Range resolution is easily changed;

Lower probability of detection;

Immunity from mutual interference in the presence of other spread spectrum radars which are in close proximity; and Implementation is independent of the frequency band of the carrier signal.

The following properties of PN maximal length sequences contribute to these features.

A PN maximal length sequence has an autocorrelation function which is a periodic triangle of height equal to N and a base $2/f_o$ wide, and a level of −1 between the triangles, where $f_o$ is the code clock frequency and N is the length of the code. The width of the auto correlation function as defined by the clock frequency enables accurate range measurements. Maximal PN sequences may be generated from an n-stage shift register with feedback points. The register length n determines the number of different maximal PN codes generated as per Table 3.3 on page 72 of SPREAD SPECTRUM SYSTEMS, Third Edition, by Robert C. Dixon (John Wiley & Sons, Inc.); this book is incorporated herein by reference.

External interference that does not auto-correlate with the code has its energy spread out over a large bandwidth by being a cross-correlation with the code, the result is that interference is attenuated by a factor of "N". This is an important consideration because of the current proliferation of mobile communications emissions that can interfere with a radar's operation.

For each length of code there is a large number of codes available to be used and each has the same optimal autocorrelation function property. Since the cross-correlation between the codes is very low and of the order of 1/N, therefore, in a situation where there are a number of radars working in close proximity of each other, if each radar uses a different code, then there is minimal interference between these radars. The selection of codes can be implemented in a very convenient manner. This property is very important when considering applications such as automobile collision avoidance, traffic detection/management, perimeter surveillance, etc where a multiplicity of radars are used in close quarters.

In a spread spectrum radar the transmitter output power is spread over a large bandwidth determined by the code generator clock frequency. The net result is that the power spectral density is considerably reduced (approximately by a factor of 1/N) to such an extent that current state-of-the-art radar detectors cannot detect such low powers per unit frequency. This is an important consideration for police radar guns.

Preferably, the spread spectrum radar measures both the Doppler velocity and range to a target. The measured Doppler velocity is a function of target speed and the angle between the radar and the track of the target. Normally, the angle is limited less than 10 degrees to minimize the measurement error. Beyond 10 degrees the error becomes unacceptable. By measuring the Doppler velocity and range of a target at two points on the target's track, the target's velocity can be computed accurately up to an angle of at least 40 degrees. This is particularly relevant to the police radar gun application.

BRIEF DESCRIPTION OF THE DRAWINGS

The preferred exemplary embodiments of the present invention will now be described in detail in conjunction with the annexed drawing, in which.

DETAILED DESCRIPTION OF THE PREFERRED EMBODIMENTS

Figure 1:
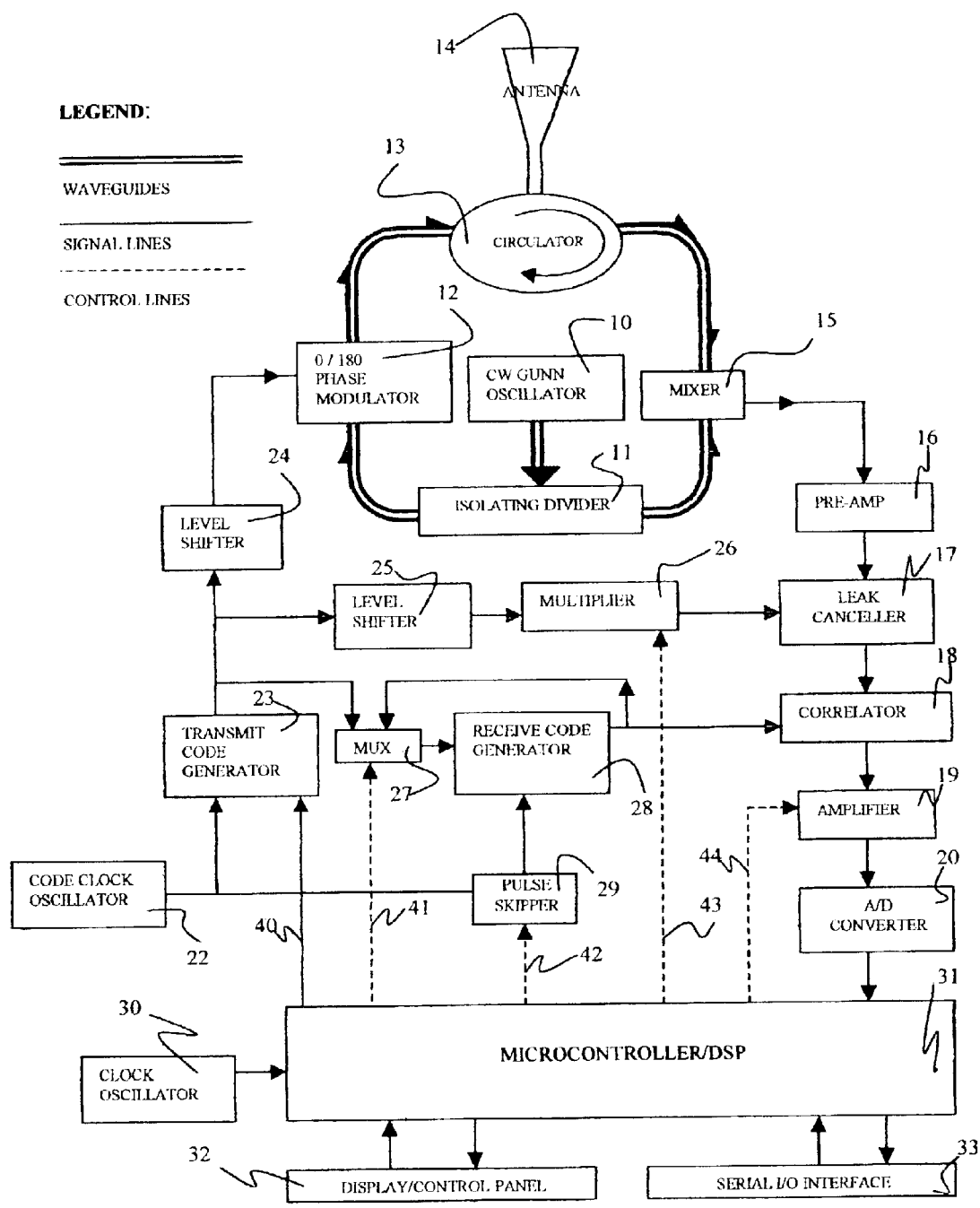
FIG. 1 is a system block diagram of a radar according to the present invention.

Referring to FIG. 1, the functions and operation of the various circuit blocks will now be briefly described.

The RF Portion

Gunn Oscillator 10: Converts DC power into microwave at carrier frequency, e.g., 35 GHz in this preferred embodiment.

Isolating Divider 11: Divides Gunn oscillator 10 output to feed phase modulator 12 and mixer 15.

Bi-phase modulator 12: Phase modulates the carrier by 0 or 180 degrees according to baseband digital modulating code input of 0 or 1.

Circulator 13: Directs input from modulator 12 to antenna 14 only. Directs return signal from antenna 14 to mixer 15 only.

Antenna 14: Radiates input from modulator via circulator 13 out to targets. Captures target returns and feeds them to mixer 15 via circulator 13.

Mixer 15: Strips carrier by mixing target return signal with carrier to output time-delayed, Doppler shifted code. Time delay depends on target-to-radar distance, Doppler shift dependent on relative velocity of target with respect to radar.

The Transmit Code Generator and Associated Blocks

Code clock oscillator 22: Provide time base (chip clock) for transmit code generator 23.

Transmit code generator 23: Maximal length PN bit sequence generator. E.g. 1023 bits in this preferred embodiment.

Level shifter 24: Converts TTL level binary bit stream into +/−2.5 Volt format Modulation drive waveform.

Level shifter 25: Converts TTL level binary bit stream into +/−1 Volt format correlator 18 drive waveform.

Multiplier 26: Microcontroller 31 controlled Four-quadrant multiplier 26 for amplitude control of leak subtraction.

The Receive Code Generator and Associated Blocks

Multiplexer 27: Selects one of two possible inputs for receive code generator 28 under microcontroller 31 control 31.

Receive code generator 28: Maximal length pseudo-random bit sequence generator. E.g. 1023 bit in this preferred embodiment.

Pulse skipper 29: Inhibits the passage of one and only one clock pulse for each asynchronous command pulse from the microcontroller.

The Analog Signal Processing Blocks

Pre-amp 16: Low-noise amplifier to amplify the mixer 15 output for subsequent processing.

Leak canceller 17: Analog differential amplifier for removal of leaked code by subtraction of a replica of equal amplitude under control of microcontroller 31.

Correlator 18: Combination analog multiplier/integrator for bit-serial correlation of receive code and target return signal.

Amplifier 19: Variable gain amplifier to match signal strength with dynamic range of A/D converter 20 under microcontroller 31 control.

A/D converter 20: Converts analog signal to digital words for subsequent digital signal processing (spectrum analysis and/or frequency measurement) by the microcontroller 31.

The Digital Processing Blocks

Clock oscillator 30: Provides system clock for microcontroller/DSP.

Microcontroller/DSP 31: Is the system controller and digital signal processor. Provides self-test, then random sequence seed generation via signal line 40. Performs synchronization of the transmit/receive code generators via signal line 41, and range bin control via control line 42. Leak cancellation is controlled via control line 43. Gain control of amplifier 19 is via control line 44. The following application-specific (radar-gun) tasks are also performed:

Determine target existence and speed on a per-range basis by spectrum analysis and/or frequency measurement;

True target speed computation (cosine correction);

Display control;

User interface; and

Response to external commands.

While digital processing could be performed by a separate DSP, microprocessors are now available to perform DSP as well as controller functions.

Display/control panel 32: Programmable operator interface as per end-use requirements.

Serial I/O interface 33: Programmable RS-232 Data output as per end-use requirements. Provides remote display/operator interface.

In a typical implementation of the circuit of FIG. 1 for a radar gun the operational parameters, for example, are as follows:

| | |
|---|---|
| carrier transmit frequency $f_c$ = | 35 GHz |
| clock frequency $f_o$ of the modulating PN code u(t) = | 50 MHz |
| PN code u(t) length = | 1023 bits |

The transmit code generator 23 output is a PN code u(t). This PN maximal length sequence code has an autocorrelation function R (τ).

$$R(\tau) = \frac{1}{T} \int_o^T u(t) u(t+\tau) dt,$$

where the code period $T = Nf_o$. The code being a balanced square-wave signal oscillating between ±1 normalized levels. The resulting ideal autocorrelation is a triangle with height N and a $$\text{base} = \frac{2}{f_o} \text{wide}$$

and a constant sidelobe level of −1.

DESCRIPTION OF SYSTEM OPERATION

The operation of the present radar system comprises a plurality of simultaneous processes, generally coordinated by the microcontroller/DSP 31 according to firmware. Processes after correlation and return signal spectrum analysis are application-specific in nature. A preferred embodiment of a police radar gun is now described with reference to the drawing figures. With modified firmware, the requirements of many other applications, such as traffic management sensors and automotive anti-collision radar sensors can be readily satisfied.

Figure 2:
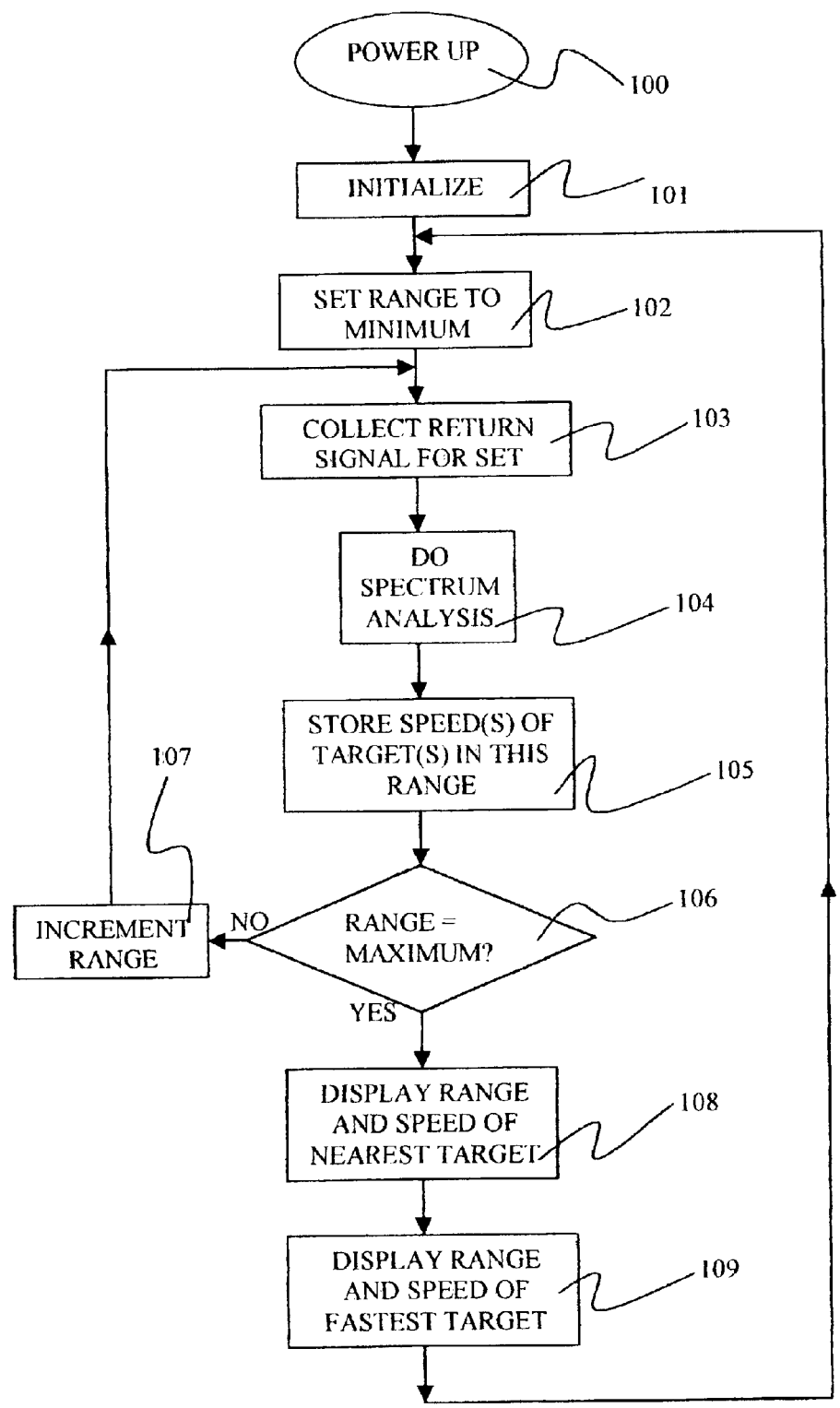
FIG. 2 is a high level flow-chart for operating the system of FIG. 1.
Figure 3:
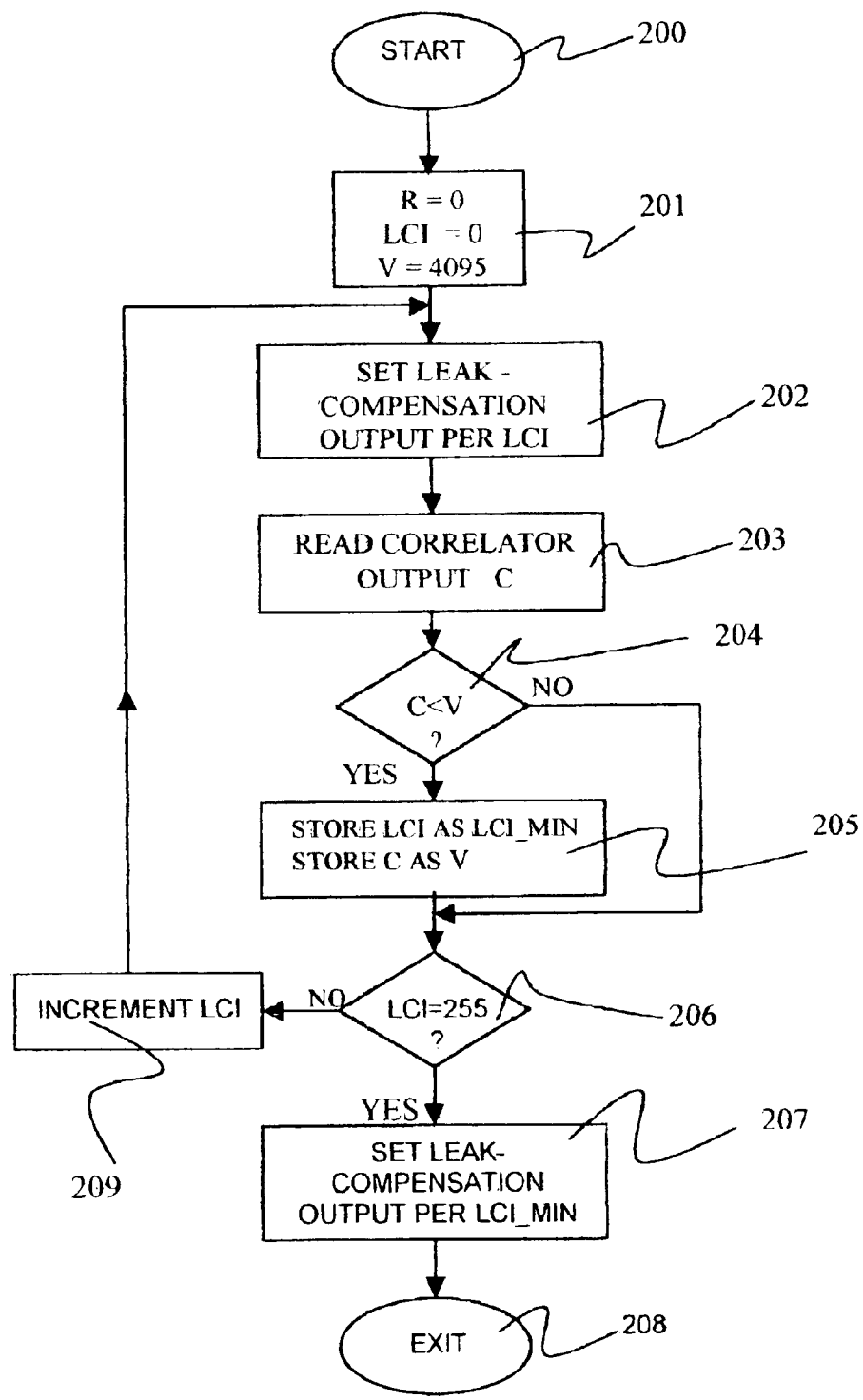
FIG. 3 is a flowchart explaining processing steps for leak-compensation adjustment.
Figure 4:
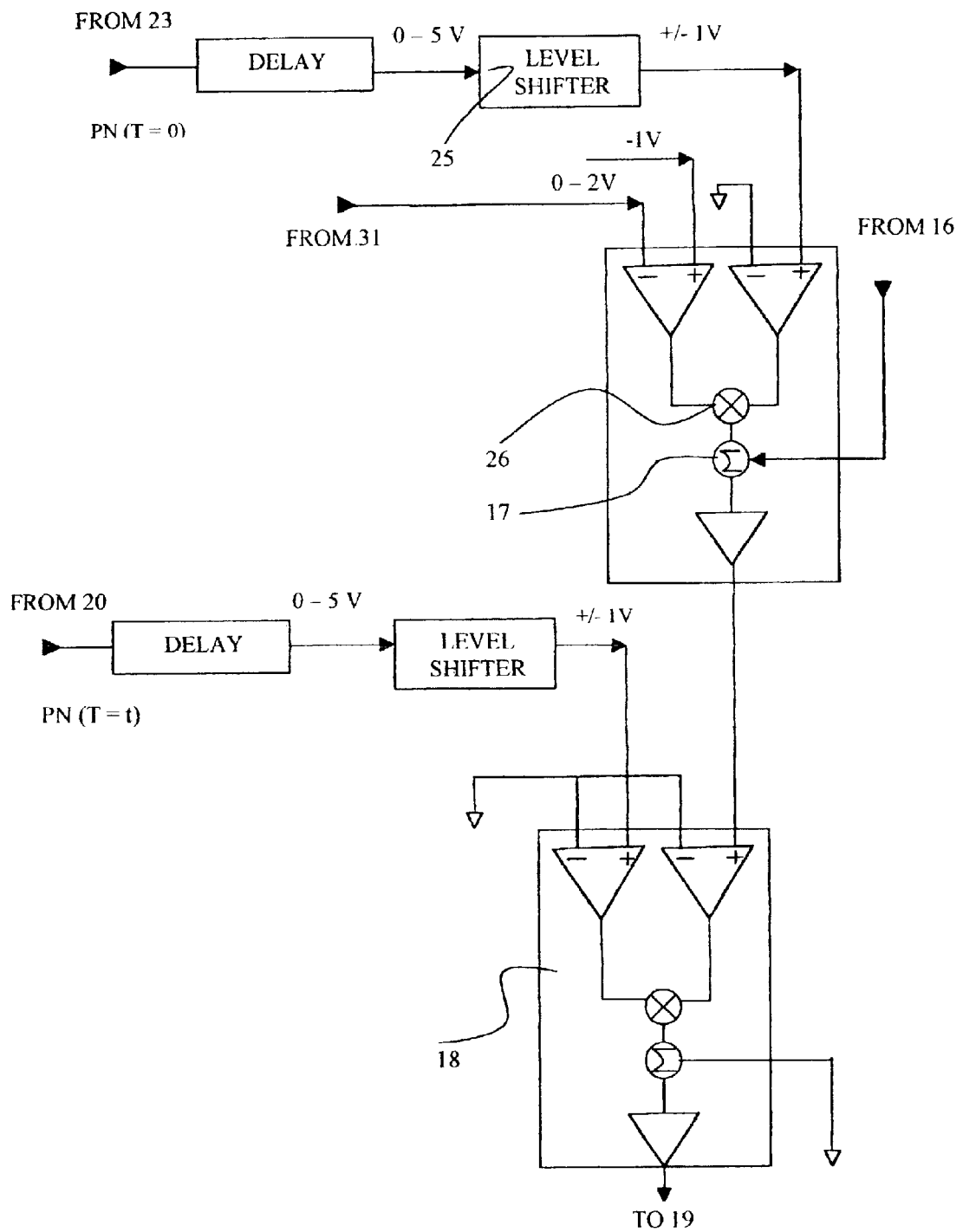
FIG. 4 shows a circuit implementation of the blocks labeled LEAK CANCELLER and CORRELATOR in FIG. 1.

The major processes are the following. (The reference numbers in the flow-charts of FIGS. 2 and 3 begin with 100 and 200, respectively).

CARRIER GENERATION: The microwave carrier is generated by the CW Gunn oscillator 10 and fed to the modulator 12 and mixer 15.

TRANSMIT CODE GENERATION: A maximal length pseudo-random bit stream of length 1023 bits is generated by generator 23. Upon powering (100) the microcontroller/DSP 31 initiates the code generation (101) by injecting, via control line 40, a seed stream of bits to guard against the generation of the undesirable all-zero bit stream. The TTL level bit stream is level shifted by level shifters 24 and 25.

BI-PHASE MODULATION: The transmit code, in the form of a bipolar pseudo-random bit stream from level shifter 24, modulates the microwave carrier at the bi-phase modulator 12. The modulated carrier is fed via circulator 13 to the antenna 14 to form the out-going radar search beam.

TARGET INTERACTION: Targets within the radiated beam will reflect microwave energy. Each reflected signal, still modulated with the transmit code, acquires a Doppler shift dependent on the relative velocity of each target (e.g. V1 & V2 in FIG. 5) relative to the transmitting antenna 14. The captured return signal at the antenna 14 therefore consists of a multitude of target reflections in the form of time delayed copies of the transmitted code, the time delay of each reflection is dependent on the distance of the target relative to the antenna 14.

TARGET RETURN DEMODULATION: Target return signal is mixed with the transmitting carrier and demodulated at the mixer 15. The target return signal is now a multitude of time-delayed, Doppler shifted copies of the original transmitted code at baseband. This signal, together with the leak, (see Leak Cancellation section) is amplified at the pre-amp 16 for further processing.

LEAK CANCELLATION: Due to the imperfection of the circulator 13 and/or impedance mismatch of the antenna 14, a portion of the out-going modulated carrier (the leak) finds a direct path into the mixer 15 instead of being radiated out via the antenna 14. This leakage has the undesirable effect of reducing the overall signal-to-noise ratio and dynamic range of the signal processing chain. Rather than perform leak cancellation in the RF domain, it is performed here at base band, resulting in a simpler arrangement. Since the leak is characterized by a near-zero time-delay relative to the transmit code sequence, a copy of the transmit code is used for the cancellation process. The transmit code from transmit code generator 23 is level shifted (24) to drive the modulator 12. Another level shifter 25 provides the same code to the leak canceller 17 via four-quadrant multiplier 26. The gain of multiplier 26 is controlled by the microcontroller/DSP 31 via control line 43. With specific reference to FIG. 3, for optimum leak cancellation, the following steps are carried out:

(a) The microprocessor/DSP 31 starts (200) by setting (201): the target range R=0; (which means that the delay of the receive code generator 20 signal applied to the correlator 18 is zero); the pointer or index LCI to a leak compensation voltage table to the first (Ø) of Ø to 225 incremental values; and the minimum leak value V to the end of the range of the (normalized) measured leak value C, which range of C varies between Ø and 4095 and is the measure of the value at the output of the correlator 18. After this initialization, the leak compensation signal level is set (202) by reading the value in the table at LCI and by controlling the multiplier 26 gain via control line 43 accordingly.

(b) The microcontroller/DSP 31 commands the mux 27 to feed the transmit code as a seeding bit-stream into the receive code generator 28. Since both code generators are identical, the transmit and receive codes become identically synchronized after ten or more clock periods;

(c) The analog chain consisting of correlator 18, amplifier 19 and A/D converter 20 is now effectively measuring the auto-correlation function of the leak (203). The microcontroller/DSP 31 varies the gain of the multiplier 26 while monitoring the A/D converter 20 output and seeks a minimum by scanning through all possible values (255 values in this example) (202, 203, 204, 205 & 209). Other methods (e.g., successive approximation) of scanning through the LCI table may be used in operation.

(d) Optimum leak cancellation occurs when the auto-correlation function is a minimum (206); and (e) The gain of the multiplier 26 for minimum leak is stored (207 & 208) in the flash memory in the microcontroller/DSP 31. This gain setting is maintained for all subsequent operations until the next optimum leak cancellation search is performed.

RECEIVE CODE GENERATION: The receive code is generated by receive code generator 28. The core of this generator is of identical design as the transmit code generator 23. A multiplexer 27 is added to allow the selection of bit stream feedback from either the receive code generation itself in normal operation or from the transmit code generator 23 (synchronization). The multiplexer 27 is controlled by the microcontroller 31 via control line 41. Further, a pulse skipper 29 is used to allow the inhibition of one and only one clock pulse in response to each asynchronous command pulse from the microcontroller 31 via control line 42.

By means of the multiplexer 27 and the pulse skipper 29 as described above, the microcontroller 31 now can synchronize the transmit and receive codes, and precisely control the time delay of the receive code with respect to the transmit code at a time resolution of one code clock period. In the preferred embodiment of this invention, the code clock period is 20 nS for a 50 MHz clock. Therefore, by issuing a series of M pulse-skip commands to the pulse skipper 29, the microcontroller 31 can cause the receive code to lag the transmit code in time by M times 20 nS, thereby moving the range gate/bin by M multiples of three meters. (While 20 nS is six meters in radar propagation distance, due to reflection the six meters are folded in half.)

Figure 5:
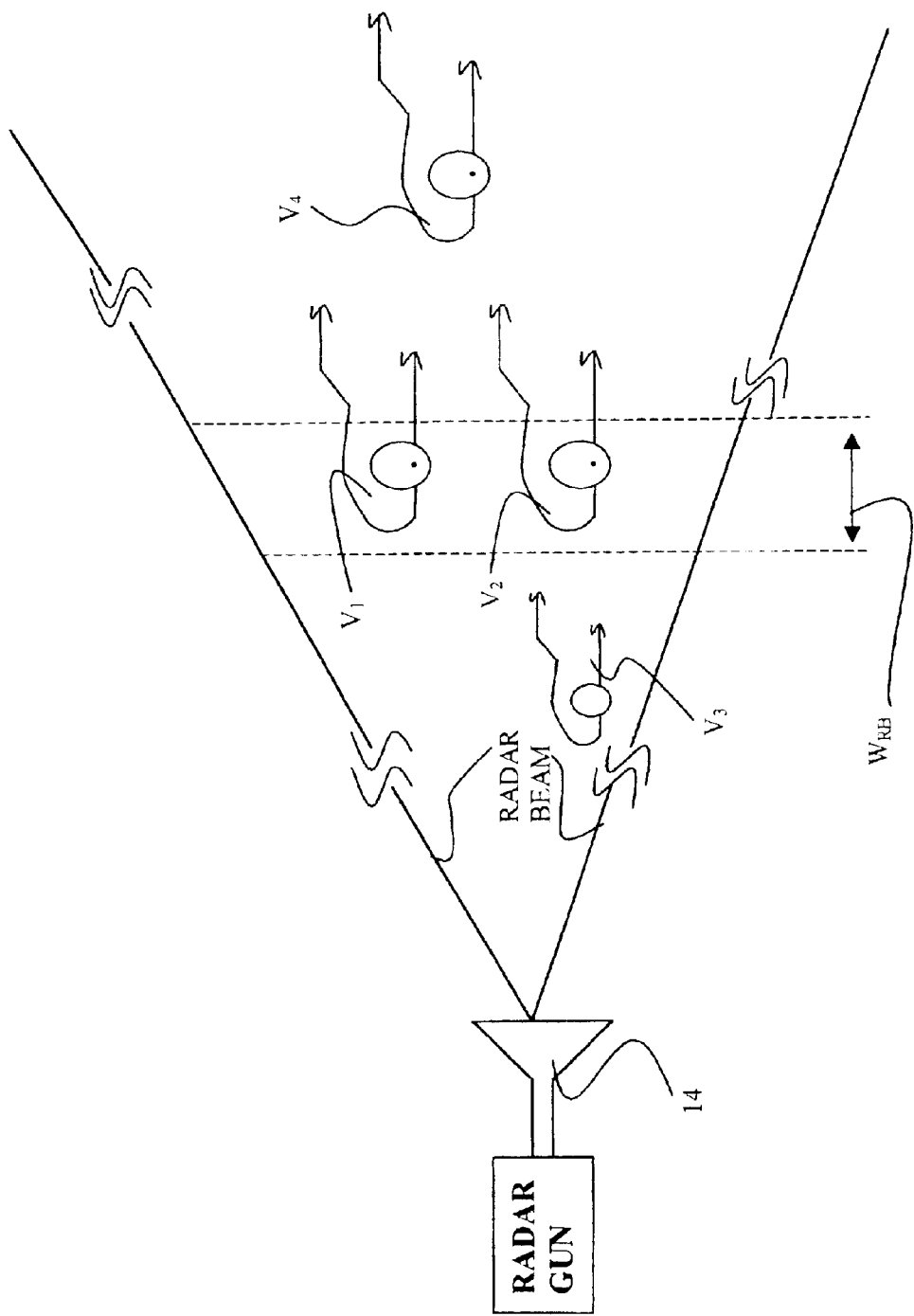
FIG. 5 illustrates use of target range gates to exclude interfering Doppler signals.

CORRELATION: After leak cancellation, the amplified return signal is bit-wise serially correlated with the receive code at the correlator 18. The correlation process, as explained under Summary of the Invention, has the net effect of suppressing all return signals (delayed copies of the transmit code) that are of time delay different from that of the receive code by more than one clock period. Return signals that are of the same time delay or within +/− half chip period as the receive code are, on the other hand, enhanced by the correlation process. As illustrated in FIG. 5, since the time delay of each return signal is dependent on the distance of the target from the antenna 14, the correlation process is effectively enhancing only signal from targets inside the "target range bin" of interest, such as vehicles V1 and V2, and suppressing all other signals, e.g. from V3 and V4, and noise. For the preferred embodiment with a 50 MHz chip clock, the range bin resolution $W_{RB}$ is 3 meters. Range resolution $W_{RB}$ can be varied in inverse proportion to the frequency of the chip clock.

RETURN SIGNAL ANALYSIS: The output of the correlator 18 is a sum of sinusoidal waveforms each resulting from the reflection of a target within the range bin of interest. The amplitude of each sinusoid is proportional to the radar cross-section of the corresponding target, while the frequency of the sinusoid is proportional to the speed of the target. A target of zero velocity relative to the antenna 14 will return a signal of zero frequency, i.e., DC.

The sum of waveforms is amplified by amplifier 19 and converted to digital form by the A/D converter 20. The gain of the amplifier 19 is controlled by the microcontroller 31 such that the amplifier 19 signal is close to, but never exceeds the dynamic range of the A/D converter 20. The digitized data stream is fed into the microcontroller/DSP 31 for spectrum analysis (104), which is accomplished by, for example, well known FFT techniques.

TARGET DETECTION: Target existence and speed in each range bin can be determined by the following process:

(1) Set the time delay of the receive code relative to the transmit code (102) according to the range bin of interest by the method as described in the "correlation" section.

(2) Apply spectrum analysis to return signal after a finite dwell time (103 & 104). The theoretical minimum dwell time per range bin is dependent on the minimum speed of interest for the intended target type. In general, the dwell time per range bin should be no less that one period of the Doppler Frequency of interest.

(3) Determine the speed of target(s) inside the range bin of interest according to its Doppler frequency (105).

By progressively changing the range bin setting and repeating the above process (106 & 107), all targets and their respective speed within the search beam can be mapped. This process is termed full-range scanning. The time for a complete range scan is equal to the dwell time per range bin multiplied by the number of range bins covered in the scan.

It is worthy of note that after a complete range scan is performed and targets mapped, subsequent scans can be drastically abbreviated by scanning only the target-bearing range bins and their immediate neighbors, plus the "entrance range bin", where new targets may first enter the area covered by the search beam. This process is termed skip-scan.

It is therefore possible to measure the target's velocity using only the elapsed time during which a target traverses two range gates. Relying only on the elapsed time would obviate the need for Doppler measurements and processing steps associated therewith, such as FFT (Fast Fourier Transform) or generally digital signal processing via a DSP, whether it is separate from or integral with the microprocessor.

TARGET DIRECTION DETERMINATION: The direction of target movement cannot be derived from its Doppler frequency. It is possible to determine target direction of movement from the result of successive skip scan (as described above) and analyzing the pattern of target occupation of range bins. In this process the speed of each target can be tracked and used as its identifying parameter for tracking its movement.

TARGET TRUE SPEED CALCULATION (COSINE CORRECTION): This is a desirable function to correct for the fact that existing radar speed measuring devices, such as police radar guns, particularly those relying on Doppler shift measurement, will indicate an incorrect speed if the vehicle's velocity vector makes an angle θ with the radar gun line-of sight to the vehicle that is larger than zero. The error may be tolerable for θ up to, say 10°. Note that θ increases as the vehicle approaches the radar gun, when the echo signal becomes stronger and reliable. In the present system, since the radar measures both Doppler shift and range of approaching vehicles by taking two sets of measurements, $f_1$, $R_1$, and $f_2$, $R_2$ and two intersecting angles, $\theta_1$ and $\theta_2$, the velocity measurement is made independent of the "cosine error" by performing the following computation in the microcontroller/DSP 31:

$$V = \frac{\lambda}{2} f_2 \frac{\sqrt{\left(\frac{f_1}{f_2}\right)^2 - \left(\frac{R_2}{R_1}\right)^2}}{\sqrt{1 - \left(\frac{R_2}{R_1}\right)^2}}, \text{ where}$$

$f_1$=doppler shift at range (distance) $R_1$,
$f_2$=doppler shift at range (distance) $R_2$,
V=velocity of vehicle, and
λ=radar wavelength Once the cosine correction has been completed the range and speeds of targets are displayed (108 & 109).

What is claimed is:

1. A radar apparatus, comprising:
   (a) radar signal transmit and receive means for simultaneously transmitting and receiving a modulated continuous wave (CW) signal;
   (b) means for generating a transmit code for modulating said CW signal prior to transmission thereof;
   (c) means for demodulating said CW signal after reception thereof to provide a received echo of said transmit code at baseband;
   (d) means for subtracting an attenuated replica of said transmit code from said received echo at baseband, thereby mitigating signal leakage from transmit to receive paths within said radar apparatus; and
   (e) means for correlating a delayed replica of said transmit code with said received echo at baseband after subtraction to provide an intermediate output of said radar apparatus.

2. The radar apparatus as defined in claim 1, wherein said transmit code is a PN maximal length code sequence.

3. The radar apparatus as defined in claim 2, further comprising microprocessor means for controlling the means for generating, the means for demodulating, the means for subtracting and the means for correlating.

4. The radar apparatus as defined in claim 3, further comprising digital signal processing (DSP) means for processing said received demodulated CW signals to identify Doppler shifted frequencies therein.

5. The radar apparatus as defined in claim 3, further comprising analog-to-digital (A/D) means for converting said intermediate output to a digital signal for processing by said microprocessor means.

6. The radar apparatus as defined in claim 4, further comprising analog-to-digital (A/D) means for converting said intermediate output to a digital signal for processing by said microprocessor means.

7. The radar apparatus as defined in claim 6, wherein said digital signal is processed to determine a range-gate distance from said radar apparatus corresponding to delay of said delayed replica of said transmit code.

8. The radar apparatus as defined in claim 7, wherein said microprocessor means computes velocities from said Doppler shifted frequencies induced by targets at said range gate distance.

9. The radar apparatus as defined in claim 6, wherein said microprocessor means and said DSP means are combined in a single data processing means for processing the output of said A/D means and controlling operation of said radar apparatus in response to interface means for interfacing the radar apparatus with a user.

10. The radar apparatus as defined in claim 8, wherein said microprocessor means and said DSP means are combined in a single data processing means for processing the output of said A/D means and controlling operation of said radar apparatus in response to interface means for interfacing the radar apparatus with a user.

11. A spread spectrum radar system having simultaneously operating transmit and receive paths, characterized in that said system includes means for mixing down received radar signals to baseband and applying them to leak cancellation means for subtracting therefrom an attenuated replica of baseband transmit radar signals to provide reflected receive radar signals with improved signal-to-noise ratio at baseband for further processing, and to prevent saturation of the radar system due to signal leakage from its transmit path into its receive path.

12. The spread spectrum radar system as defined in claim 11, further characterized in that said system includes means for correlating said reflected receive radar signals at baseband with delayed replicas of said baseband transmit radar signals to provide an intermediate output of the radar system.

13. The spread spectrum radar system as defined in claim 12, wherein said system includes means for converting said intermediate output by an analog-to-digital converter for processing by a microprocessor to determine Doppler frequencies of said received radar signals induced by targets as distances determined by delays of said delayed replicas.

14. The spread spectrum radar system as defined in claim 13, wherein velocity V of a target is computed according to:

$$V = \frac{\lambda}{2}f_2 \frac{\sqrt{\left(\frac{f_1}{f_2}\right)^2 - \left(\frac{R_2}{R_1}\right)^2}}{\sqrt{1 - \left(\frac{R_2}{R_1}\right)^2}}, \text{ where}$$

$f_1$=doppler shift at range (distance) $R_1$,
$f_2$=doppler shift at range (distance) $R_2$,
V=velocity of vehicle, and
$\lambda$=radar wavelength.

15. A method of processing reflected received radar signals, comprising the steps of:
(a) detecting a target induced first Doppler frequency-shift ($f_1$) associated with a first distance range ($R_1$);
(b) detecting a target induced second doppler frequency-shift ($f_2$) associated with a second range ($R_2$); and
(c) computing velocity (V) of the target reflecting said reflected received
(d) radar signals from $f_1$, $R_1$, $f_2$, $R_2$ and the wavelength (A) of said radar signals.

16. The method of processing reflected recessive radar signals as defined in claim 15, wherein in step (c) V is computed according to:

$$V = \frac{\lambda}{2}f_2 \frac{\sqrt{\left(\frac{f_1}{f_2}\right)^2 - \left(\frac{R_2}{R_1}\right)^2}}{\sqrt{1 - \left(\frac{R_2}{R_1}\right)^2}}.$$

* * * * *

UNITED STATES PATENT AND TRADEMARK OFFICE
CERTIFICATE OF CORRECTION

PATENT NO. : 6,801,153 B2
DATED : October 5, 2004
INVENTOR(S) : Rauch et al.

It is certified that error appears in the above-identified patent and that said Letters Patent is hereby corrected as shown below:

Column 12,
Line 21, "(d) radar" should be -- radar --.

Signed and Sealed this

Fifth Day of April, 2005

JON W. DUDAS
*Director of the United States Patent and Trademark Office*